INVENTOR.
WAYNE E. QUINTON
BY Christensen, Sanborn & Matthews
ATTORNEYS

Fig. 4.

United States Patent Office 3,518,985
Patented July 7, 1970

3,518,985
CONTROL SYSTEM FOR AN EXERCISE MACHINE USING PATIENT'S HEART RATE AND HEART RATE ACCELERATION
Wayne E. Quinton, 3051 44th Ave. W., Seattle, Wash. 98199
Filed Feb. 15, 1968, Ser. No. 705,837
Int. Cl. A61b 5/02
U.S. Cl. 128—2.06          10 Claims

ABSTRACT OF THE DISCLOSURE

This application discloses an improved piece of equipment for providing controlled exercise of a person, and includes the disclosure of a control system including equipment for monitoring the rate of change of heartbeat of the person being exercised. The system disclosed permits the achievement of a constant heart rate in a manner which avoids overshoot and system oscillation. Control circuits are disclosed for adjusting the operation of an exercise machine in a manner such that a desired heart rate is achieved via a selected heart rate acceleration. Details of one system utilizing a treadmill-type exercise machine in combination with the heart rate acceleration monitoring equipment for controlling the speed of the treadmill are disclosed.

At the present time controlled exercise devices such as treadmills and bicycle ergometers are widely used in the medical field for detection and treatment of cardiac conditions. The heart rate of the patient undergoing controlled exercise is monitored with the heart rate information being utilized for controlling desired changes in the treadmill or similar equipment giving rise to the physical exercise by the patient. In such systems it is desirable to have the ability of adjusting the load (i.e. treadmill speed or angle of inclination) so that the heart rate can be brought to a constant level. It is well known that the heart rate does not follow in linear relation the changes in work load applied to the patient, and in fact it can be shown that not only is there a time lag between increase of work load and increase of heart rate, but also it can be shown that substantial variations in heart rate occur even though the speed of a treadmill or similar exercise device is being changed at a constant rate. Thus in prior art systems a problem has been encountered in attempting to bring a patient to a predetermined condition of exercise such that the heart rate is at a selected constant rate. Thus it would be advantageous to not only be able to bring the heartbeat to a selected constant rate but to also have the ability to bring the patient to such a condition of exercise without encountering substantial overshoot or fluctuations of the heart rate.

It is therefore an object of the present invention to provide an improved heart rate control system for an exercise machine. Another object is to provide such a system wherein a predetermined constant heartbeat rate can be achieved.

Another object of the present invention is to provide a heartbeat monitoring system which serves to control an exercise machine in a manner such that the work load of the exercise machine is adjusted in response to output heart rate signals with the heart rate being brought to a preselected constant rate without substantial overshoot and without widely varying fluctuations in the heart rate and exercise machine work load.

An additional object of the present invention is to provide a heart rate control system incorporating visual display devices for indicating heart rate as well as rate of change of heart rate.

An additional object of the present invention is to provide an automatic heart rate controller with visual indication devices for indicating when the rate of a given patient's heartbeat is approaching the maximum rate possible for that patient and thus permit automatic or manual control of associated exercise equipment to avoid damage to the patient, which could otherwise result from increasing the speed of the exercise equipment beyond the capabilities of the individual.

The above advantages and objects are achieved through the use of a control system wherein electrocardiograph signals are obtained from a patient through the use of conventional equipment which provides output signals representative of the heart rate. After amplification the ECG signals are monitored by a heart rate meter so that a visual indication of heart rate is provided to the operator. In addition, the system includes a heart rate acceleration determining circuit having a heart rate acceleration meter associated therewith for providing a visual indication of the rate of change of heart rate. A control device responsive to the heart rate and heart rate acceleration signals is coupled with a treadmill control in a manner such that the work load of a treadmill (or similar exercise device) is adjusted automatically. In one system the work load is so adjusted as to bring the heart rate of a patient to a selected constant value without any substantial overshoot of the heart rate. By monitoring the heart rate acceleration signal as the work load is being increased, the system provides an indication when the patient is approaching his maximum biological capability (i.e. his maximum permissible heart rate). As this condition is approached during work load increase the heart rate acceleration signal approaches a stable value. Thus the operator knows that the applied work load must not be increased by any substantial amount if damage to the patient is to be avoided, or the equipment can be automatically controlled to prevent any further work load increase. The system includes controls permitting the operator to preestablish the desired constant heart rate and also to preestablish the rate of acceleration of heart rate.

The above as well as additional advantages and objects of the invention will be more clearly understood from the following description when read with reference to the accompanying drawings wherein, FIG. 1 is a schematic block diagram illustrating the system concepts of the present invention.

FIG. 4 is a schematic circuit diagram of one preferred embodiment of the invention.

Figure 1:
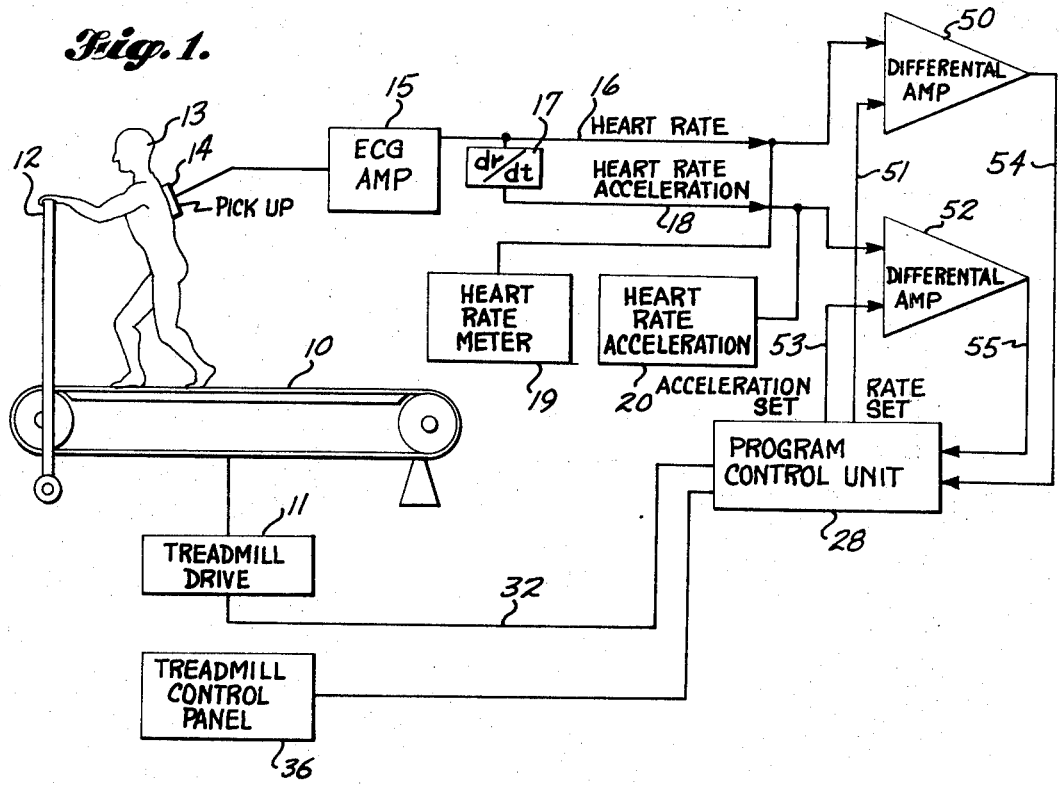

Turning now to the drawings, in FIG. 1 the treadmill 10 includes an endless belt driven at a speed determined by the energization of the drive motor 11. As is common in the art, suitable support handles 12 are provided for the patient 13 as he walks on the upper surface of the treadmill 10. A conventional electrocardiograph (ECG) pickup device 14 is secured to the patient for monitoring his heartbeat and providing output signals to an ECG amplifier 15. The output circuit 16 of the amplifier 15 thus provides signals representative of the rate at which the patient's heart is beating. The output circuit 16 is coupled with a differentiating circuit 17 which serves to take the first derivative with respect to time of the heart rate signals. The output circuit 18 thereof thus provides signals representing the rate of change of the patient's heart rate and this is identified as the heart rate acceleration circuit. A heart rate meter 19 coupled with circuit 16 provides a visual indication of the rate at which the patient's heart is beating. The heart rate acceleration meter 20 coupled with circuit 18 provides a visual indication of the rate at which the patient's heart rate is changing. In practice these meters are incorporated in the control panel of the control unit 28. As seen more clearly in FIG. 2, the heart rate acceleration meter 20 and the heart rate meter 19 are provided by conventional D'Arsonval meter movements which respond to the rate and acceleration signals.

In one system described hereinafter the heart rate meter 19 presents a rate display on a beat-by-beat basis with no averaging or time constant involved. If the heart rate changes instantaneously from 100 to 150 beats per minute (b.p.m.), the heart rate indicator indicates on the second beat the exact heart rate. During the first beat the instrument may read approximately 90% of the proper value due to the relatively wide change in heart rate given in the above example. However if the heart rate changes no more than 15 b.p.m., the instrument immediately reflects an accurate heart rate. Since the circuit 17 takes the first derivative of heart rate with respect to time, it is seen that the meter 20 provides an indication of heart rate acceleration in beats per minute per minute. As seen most clearly in FIG. 2, the system includes a heart rate acceleration control switch 30 which is essentially an "on-off" switch located near the center and in the lower portion of the control panel. In the off position the heart rate acceleration meter reads zero and the feedback mechanisms described hereinafter which respond to the heart rate acceleration signals are eliminated. In one particular system movement of the switch 30 to its on condition causes the feedback system to be responsive to acceleration signals, with the heart rate acceleration being averaged over 10 to 20 heart-beats.

Figure 2:
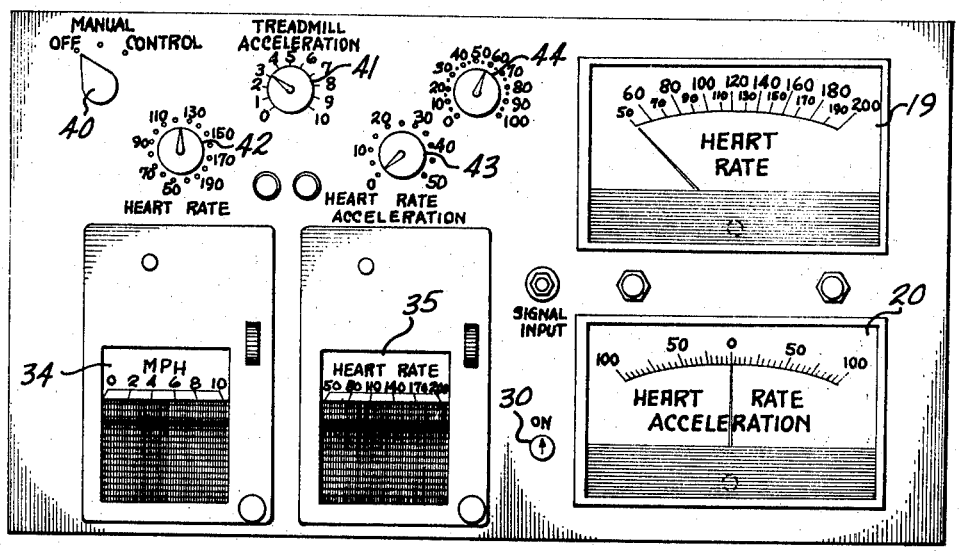
FIG. 2 is an enlarged front view of the control panel and associated indicating devices for one preferred embodiment of the control system.
Figure 3A:
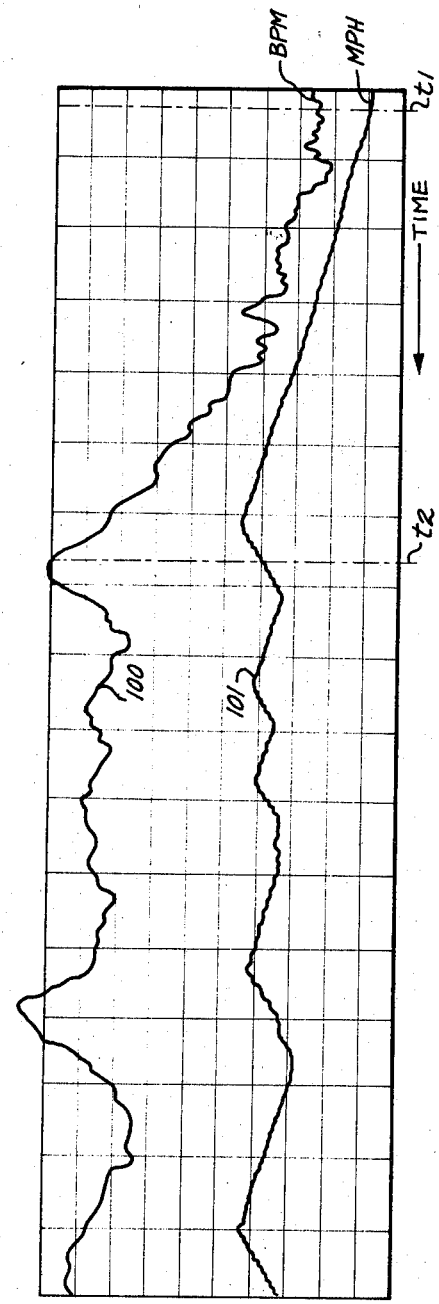
FIG. 3A is a graph showing the results achieved by the system of FIG. 1 when heart rate acceleration signals are not utilized in the system for controlling work load.
Figure 3B:
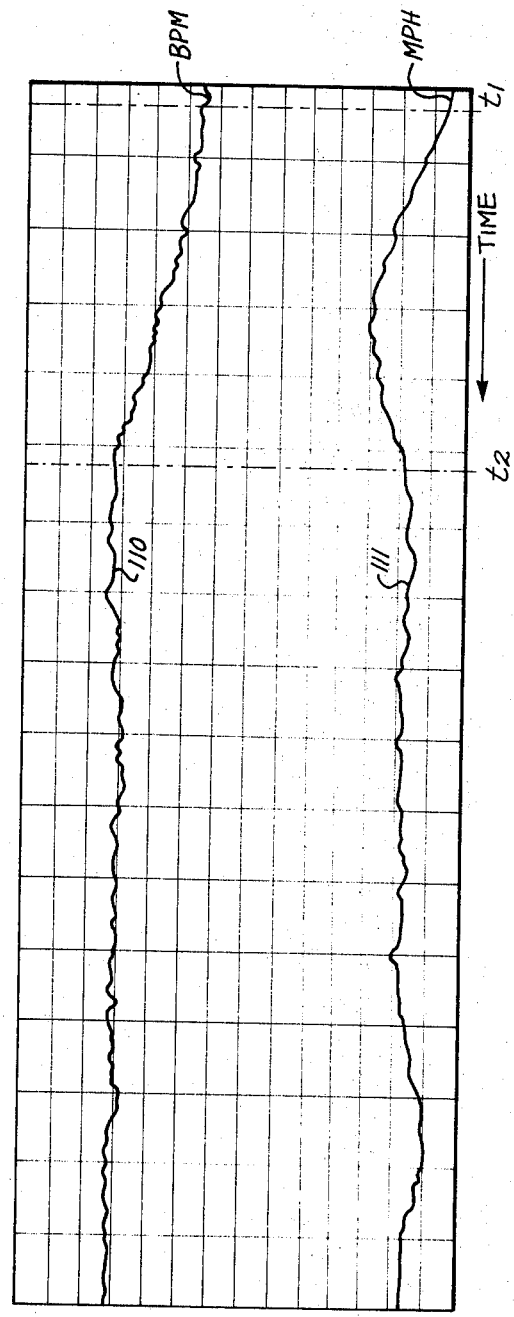
FIG. 3B is a graph illustrating the results achieved when the heart rate acceleration signals are utilized in the system of FIG. 1 for controlling applied work load.

As seen in FIG. 1 the treadmill drive (which can be any suitable electric motor and drive assembly) is coupled by circuit 32 with the program and control unit 28. As seen in FIG. 2 unit 28 is provided with a recorder 34 which records and thus provides a visual indication of the speed at which the surface of the treadmill is moving. In the particular system illustrated treadmill speed is indicated in miles per hour. The control panel also includes a heart rate recorder 35 and thus the system is adapted to provide simultaneous recording of the patient's heart rate and the speed at which the treadmill is moving. Results achieved using a system wherein the heart rate and treadmill speed were both recording on a single tape are seen in FIGS. 3A and 3B and described hereinafter.

As seen in FIG. 2 the program control unit 28 is provided with a manual control switch 40 which can be set to provide either manual or automatic control of the treadmill drive. In the manual position the treadmill control panel 36 of FIG. 1 is switched into control over the drive 11. The system also includes a treadmill acceleration control 41, a heart rate control switch 42 which permits the operator to establish the heart rate to which the patient is to be brought, and a heart rate acceleraion control switch 43 which permits selection of the rate of change of the patient's heartbeat. The usual ECG control switch 44 is included.

As seen in FIGS. 1 and 2, and in the circuit diagram of FIG. 4 described hereinafter, the heart rate control switch 42 serves to establish a selected level of input signal for a first differential amplifier 50 having input circuit 51 and the output circuit 16 of the ECG amplifier 15 coupled therewith. In a similar manner a second differential amplifier 52 is coupled by circuit 53 with the acceleration control switch 43 and by the circuit 18 from the differentiating circuit 17. The differential amplifiers 50 and 52 operate to provide output signals on leads 54 and 55 respectively to the program and control unit 28. These signals are in turn used to control the applied work load. In the illustrated system the speed of the treadmill 10 is automatically controlled in response to the signals from the differential amplifiers. The arrangement is such that the controls 42 and 43 effectively provide reference voltages for the differential amplifiers 50 and 52 with the heart rate and heart rate acceleration signals being compared thereto for control of the treadmill speed and rate of change of speed. The program and control unit 28 is so connected to the differential amplifiers and the treadmill drive that the treadmill speed is maintained constant when there is no signal from the two differential amplifiers. If the rate and acceleration signals differ from the program established comparison signals the treadmill speed is adjusted automatically until signal balance is achieved. Thus it will be seen that a closed loop feedback system is provided with the patient's heart being one of the signal generating devices in the loop, with the system controls serving to adjust treadmill speed so that the heart rate of the patient is brought to a selected value.

With an individual coupled to the ECG amplifier and the heart rate control switch 40 being set in its "control" position, the speed of the treadmill will be automatically adjusted to achieve a selected heart rate at the selected acceleration. For example, the heart rate control 42 can be set to the maximum rate at which it is desired to exercise the individual. The heart rate acceleration control 43 is set to the desired acceleration value. Adjustment of the heart rate acceleration switch 43 in effect controls the warm-up time or rate of application of work load to the patient. The treadmill acceleration control 41 determines the repetitive rate at which the tread mill is increased or decreased in speed. In the illustrated system setting the treadmill acceleration reading to "zero" provides the minimum treadmill speed change, and a setting of "ten" provides a maximum speed change with experience indicating that settings between five and seven work well. If more rapid acceleration of the treadmill is desired, settings as high as ten can be used.

Figure 4:
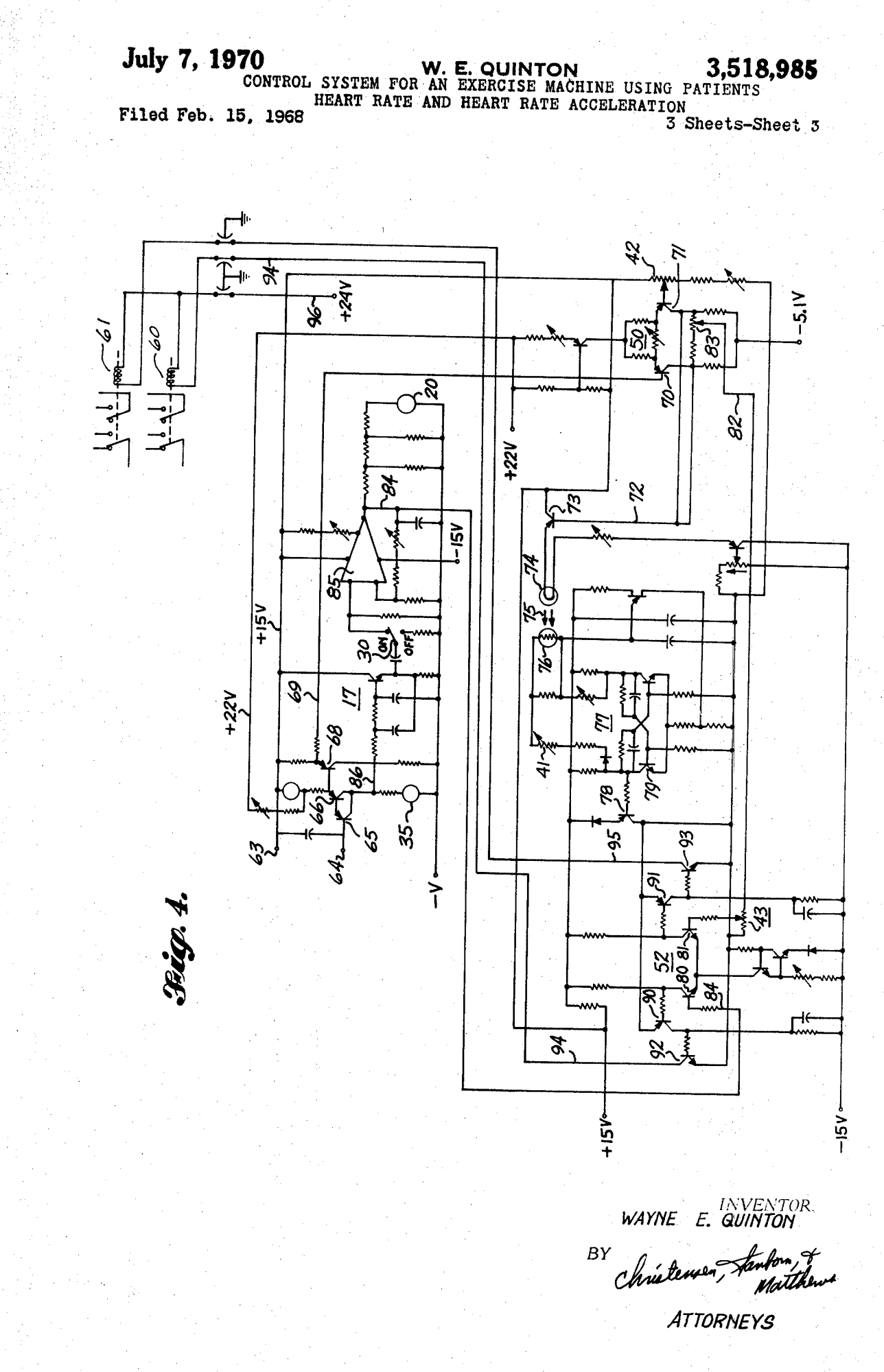

Turning now to FIG. 4 the circuit details of one preferred embodiment of the present invention will be described. In treadmill devices such as illustrated in FIG. 1 a variable pitch pulley arrangement in combination with a motor driven pulley adjustment system is utilized for controlling the speed of the treadmill. Such pulley and drive arrangements are per se known in the art and therefore in the system of FIG. 4 such details have been omitted with only the speed increase and speed decrease relays 60 and 61 being shown together with the control arrangement for selective energization of the speed increase and speed decrease relays. In the system of FIG. 4 the speed control relays 60 and 61 are controlled through the use of control pulses of fixed width but with the recurrent rate and amplitude of the fixed width pulses being determined by the heart rate and heart rate acceleration error signals.

The input terminals 63 and 64 receive amplified ECG signals representative of the patient's heart rate. These are further amplified by the transistors 65 and 66 with the heart rate meter 19 being in the emitter circuit of the transistor 66. The heart rate recorder 35 of FIG. 2 is seen to be connected in the collector circuit of transistor 66. After further amplification by transistor 68 the monitored heart rate signals are applied by lead 69 to the base of transistor 70 which forms part of the differential amplifier 50. The second transistor 71 in the differential amplifier 50 will be seen to be under the control of the heart rate control switch 42. The output circuit 72 from the differential amplifier 50 controls the transistor 73 which is connected in circuit with the light source 74 and serves to control the energization thereof. A light pipe indicated generally at 75 is positioned adjacent the light source 74 and serves to direct the radiant energy therefrom onto the photosensitive resistor 76 which is connected in the timing circuit of a multivibrator 77. The multivibrator 77 serves to provide output pulses of a constant width with the repetition rate of the multivibrator being determined by the resistance of photoresistor 76 and the setting of the treadmill acceleration potentiometer 41.

Transistor 78 will be seen to be coupled with the collector of NPN transistor 79 of the multivibrator 77 and thus serves as the output circuit for the multivibrator and further serves to control output signals from the second differential amplifier 52 having transistors 80 and 81 therein. It will be seen that the first differential amplifier 50 is effectively coupled with the second differential amplifier 52 by means of the output circuit 82 from differential amplifier 50 extending from the adjustment resistor 83 connected between the collectors of transistors 70 and 71 to the resistance element of the heart rate acceleration switch 43. Heart rate acceleration switch 43 will be seen to be coupled with the base of transistor 81 and hence establishes the comparison level for comparison of the heart rate acceleration information being monitored from the heart rate signal derived from the patient. The actual heart rate acceleration signal derived from the patient is applied to the base of transistor 80 by circuit 84 which will be seen to be connected to the output circuit of the operational amplifier 85.

The input circuit for the operational amplifier 85 will be seen to be derived from the heart rate control on-off switch 30 which in turn is coupled with the differentiating circuit 17. Circuit 86 connected to the collector of transistor 66 provides heart rate signals to the differentiating circuit and hence to the operational amplifier 85 for application to the base of transistor 80 in the differential amplifier 52.

The collectors of transistors 80 and 81 in differential amplifier 52 are respectively connected to the bases of transistors 90 and 91 which as previously described are coupled with the output transistor 78 from the multivibrator 77. Thus the error signal detected by the differential amplifier 52 is effectively gated by the multivibrator 77 for application to the speed increase and decrease relays 60 and 61 described above. The transistors 90 and 91 are in turn coupled with the differential amplifier output transistors 92 and 93 having their collector circuits 94 and 95 respectively connected to the positive 24 volt supply terminal 96 through the windings of the speed control relays. The arrangement of the adjustment for the differential amplifier 52 and the gating of the output signals therefrom will be seen to be such that when the setting of the heart rate acceleration control 43 calls for an increase in the work load applied to the patient the increase relay 60 will be operated. Conversely if the relative magnitudes of the signals derived from the patient and from the control settings are such that work load should be decreased the decrease relay 61 will be operated. Note that the multivibrator 77 is free running and therefore the system is based on slight changes occurring in the motor and pulley transmission arrangement and hence a given "dead band" is built into the system. Major system oscillations are therefore avoided with the degree of responsiveness of the system being readily adjusted to the desired level.

In FIGURE 3A there is illustrated a section of a record obtained from equipment such as that previously described but wherein the heart rate acceleration information is not used for adjusting the work load applied to the patient. Line 100 is the record obtained from the system showing the heart rate of the patient in beats per minute. The line 101 immediately below line 100 represents speed of the treadmill in miles per hour. It will be seen that during the start of an exercise program the speed of the treadmill increases at a substantially uniform rate while the pulse rate of the patient changes at a rate which does not correspond to the rate of change of the treadmill. After approximately six and one-half minutes the rate of the patient's heatbeat has exceeded the constant rate which was desired in the particular test and thus the speed of the treadmill decreases. A short time later the heart rate of the patient decreases and undershoots the desired constant rate. Thereafter it will be seen that the treadmill control system is effectively trying to adjust for the variations in heat rate in order to bring the patient's heart rate to the selected constant value but is essentially unable to achieve the same due to the overshoot and undershoot conditions indicated by the line 100.

In the diagram of FIG. 3B the results achieved when the heart rate acceleration information is utilized in the system in the manner described above and shown in the circuit diagrams is utilized. It will be seen that in the example of FIG. 3B the treadmill is initially accelerated and that in response thereto the pulse rate of the patient increases as indicated by the line 110. However it should be noted that while the pulse rate is increasing the system recognizes that an overshoot will occur unless the treadmill speed is decreased. This is automatically accomplished as a result of the effect of the heart rate acceleration signals on the control system. It will be seen from FIG. 3B that in approximately six and one-half minutes the system has brought the patient to the desired condition of exercise and that his heart rate remains essentially constant at the desired rate.

In using the equipment it is found that a fluctuation of heart rate acceleration during exercise is seen with the fluctuation being both "plus" and "minus" although the general trend is in a "plus" direction during increasing heart rates. An interesting aspect of the system and its manner of control is that when the maximum biological heart rate for a given patient is approached or actually achieved the acceleration reading becomes very stable, and in fact typically goes to zero reading which is very stable. This zero reading is found to occur approximately 30 to 60 seconds before the maximum heat rate is reached. Therefore the equipment operator is able to detect the approach of the individual's maximum biological heart rate and thus be alerted to prevent any damage to the patient. It is evident that the system can include the ability to alter the treadmill speed in response to the specified condition of heart rate acceleration.

There has thus been disclosed an improved piece of exercise equipment and more particularly an improved control system for controlling the application of work load to a patient whose heartbeat is being monitored. While the system has been disclosed by reference to presently preferred embodiments it will be obvious to those persons skilled in the art that various changes can be made without departing from the inventive concepts.

What is claimed is:

1. A control system for an exercise machine wherein the heartbeat of a patient is monitored and the work load applied to the patient is controlled by adjustment of the exercise machine, comprising in combination: first circuit means providing heart rate signals; second circuit means providing heart rate acceleration signals; and work load control means connected to said first and second circuit means and operative to provide output signals for adjusting the exercise machine and thereby the work load applied to the patient in response to said heart rate and heart rate acceleration signals.

2. A control system as defined in claim 1 wherein said control means includes heart rate acceleration control means settable to provide a first control signal; and signal comparison means coupled with said second circuit means and with said acceleration control means for providing a first control signal.

3. A system as defined in claim 2 wherein said control means includes heart rate control means settable to provide a second control signal; and second signal comparison means coupled with said first circuit means and with said rate control means for providing a second control signal.

4. A system as defined in claim 3 wherein said first and second signal comparison means are interconnected and said first and second signals are combined to provide said output signal for work load adjustment.

5. A system as defined in claim 1 including heart rate acceleration display means coupled with said second circuit means for providing visual indication of the rate of change of the patient's heart rate.

6. A system as defined in claim 1 wherein said second circuit means includes a differentiating circuit connected to said first circuit means.

7. A system as defined in claim 1 wherein said control means includes first and second settable signal means for establishing desired heart rate and heart rate acceleration values for a patient; differential amplifier means connected to said first and second circuit means and to said first and second signal means; and third circuit means coupled with said differential amplifier means and providing output control signals to said machine which are of constant time duration with the amplitude and repetition rate of the output control signals being adjusted in response to signals from said differential amplifier means.

8. A system as defined in claim 7 wherein said differential amplifier means provides a first error signal proportional to the difference between the patient's actual heart rate and the desired heart rate, and the repetition rate of said output control signals is controlled by said first error signal.

9. A system as defined in claim 8 wherein said differential amplifier means provides a second error signal proportional to the difference between the patient's actual heat rate acceleration and a desired heart rate acceleration, and wherein said second error signal determines the amplitude of said output control signals.

10. A patient exercise system comprising in combination: an adjustable work load machine; first circuit means including heartbeat sensing means adapted to provide first and second output signals in response to the beat of a patient's heart while the patient is responding to a work load provided by said machine, said first signal being proportional to the patient's heart rate and said second signal being proportional to the rate of change of the patient's heart rate; second circuit means including first and second control switches providing first and second program signals; and control circuit means connected to said machine and including differential amplifier means connected to said first circuit means and to each of said control switches, said control circuit means being responsive to differences between said first output and said first program signal and to differences between said second output signal and said second program signal to adjust said machine and thereby the work load on the patient.

References Cited

UNITED STATES PATENTS 3,032,029   5/1962   Cunningham _____ 128—2.1
3,395,698   8/1968   Morehouse _____ 128—2.05

ANTON O. OECHSLE, Primary Examiner

T. ZACK, Assistant Examiner

U.S. Cl. X.R.

73—379; 272—69